United States Patent

Miller

[15] 3,679,034
[45] July 25, 1972

[54] SELF-ADJUSTING ELECTROMAGNETIC CLUTCH

[72] Inventor: Donald L. Miller, Horseheads, N.Y.
[73] Assignee: The Bendix Corporation
[22] Filed: March 31, 1971
[21] Appl. No.: 129,742

[52] U.S. Cl............................192/111 A, 192/35, 192/84 A, 188/71.8
[51] Int. Cl.........................................................F16d 11/00
[58] Field of Search................192/84 R, 84 A, 111 A, 111 B, 192/54, 18 B, 35; 188/71.8

[56] References Cited

UNITED STATES PATENTS

| 2,692,035 | 10/1954 | Rabinow | 192/84 R |
| 2,966,977 | 1/1961 | Johnson | 192/84 A |
| 3,168,175 | 2/1965 | Straub et al. | 192/111 A |
| 3,214,084 | 10/1965 | Smirl | 192/111 A |

Primary Examiner—Allan D. Herrmann
Assistant Examiner—Randall Heald
Attorney—Bruce A. Yungman and Plante, Hartz, Smith & Thompson

[57] ABSTRACT

An electromagnetic clutch with wear compensating means having mating frustro-conical friction members for transmitting torque and a ferro-magnetic armature threaded to one of said friction members for clutch engagement. When the clutch is energized, the armature, which is not in the drive train, comes into contact with the pole faces of the electromagnet causing the freely mounted armature to decrease in rotational velocity. The driving friction member continues to rotate at input speed thereby advancing on its helical thread until engagement with the driven friction member. The driving friction member is driven through a flexible member which also serves as a return spring upon de-energization.

5 Claims, 1 Drawing Figure

Patented July 25, 1972 3,679,034
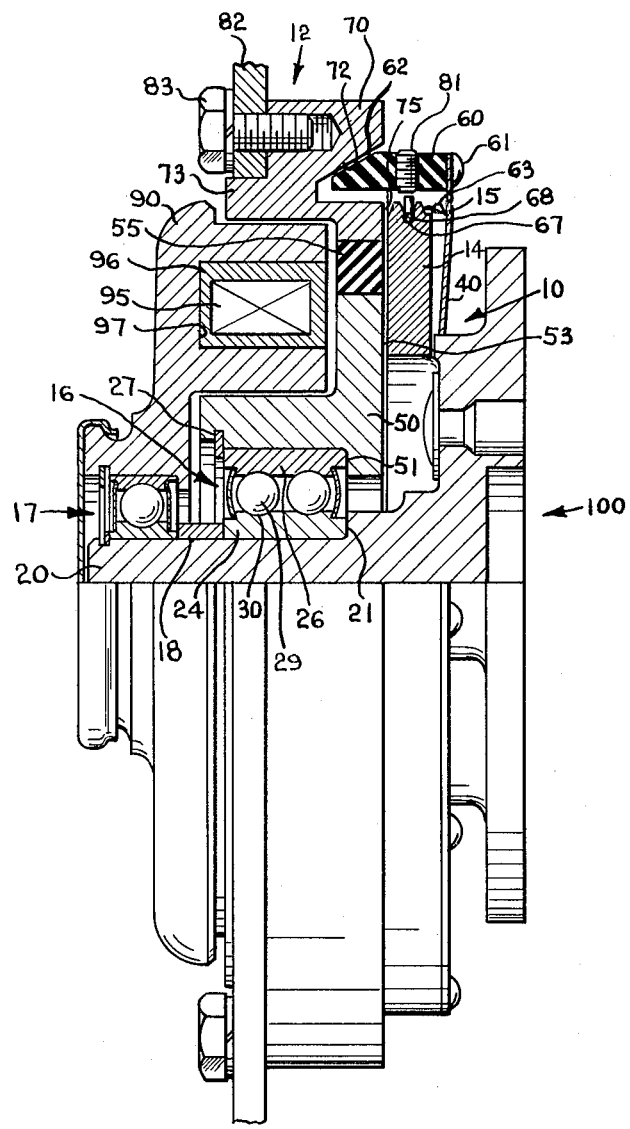
DONALD L. MILLER
INVENTOR.
BY *Bruce H. Yungman*

SELF-ADJUSTING ELECTROMAGNETIC CLUTCH

BACKGROUND OF THE INVENTION

This invention relates to electrically operated friction devices and controls therefor and more particularly to an electromagnetic self-adjusting cone clutch.

BRIEF DESCRIPTION OF THE PRIOR ART

Electromagnetic clutch devices have been found to be particularly desirable in applications such as automobile air conditioning systems in which the transmission of power to a fan must be controlled by a device having considerable compactness. Such application places particular requirements on the clutch in that they must be of more simplified and economical construction to be commensurate with the aims of modern automobile design; the clutch in such systems may be engaged for long periods of time and must be sufficiently durable to withstand use with little signs of wear. Although known electromagnetic clutches have proved to be successful in meeting the above requirements, the instant invention is concerned with an improvement in construction which greatly frees the manufacturer as to the selection of construction materials and substantially reduces manufacturing costs without sacrificing ability to handle load requirements.

Heretofore, there has existed at least two recognizable types of electromagnetic clutch constructions, one herein called the "cone" variation and the other herein called the "disc" variation. In the cone type, interengaging surfaces for friction working faces between engageable rotatable clutch elements are conically shaped and by their inherent geometrical configuration require less axial force to develop sufficient frictional locking of the working faces for conjoint rotation. In the disc type, the engaging surfaces for frictional working faces are generally disposed normally to the axis of the engageable rotatable clutch elements, and in the instances where the flux linkages pass through the working faces, the armature pull is entirely axial. The disc construction is particularly advantageous due to the facility it provides for large axially directed flux linkages and thereby providing for a stronger clutch engaging force.

Other prior art designs are known which allegedly combined the desirable characteristics of the two known types of electromagnetic type constructions mentioned above. One such design provided an armature ring element which had a generally L-shaped radial cross-section; the element had one annular pole piece with a frustro-conical face and another annular pole piece with a flat disc-like face disposed normally to the clutch axis. This design, however, had several disadvantages. For example, since the armature ring element was one piece, there was no means for compensating for wear of either pole piece. Further, with the above mentioned design, the cone friction surface must be made from a magnetic material. Yet another disadvantage results from this design, in that the outer magnetic pole force is almost radial instead of the preferred axial.

Another design using the same principle threaded the cone pole piece to the disc-like pole piece. This design added yet one more disadvantage to those listed above. By forcing the flux to pass through the thread, there must necessarily be an even greater loss in flux.

SUMMARY OF THE PRESENT INVENTION

This invention is an electromagnetic clutch apparatus for torque transmission having input means, output means, clutch actuating means including an electromagnetic winding, an armature drivingly connected to the input means and operative to contactively engage with said output means in response to the actuating means, a cone shaped torque transmitting friction member threaded to the armature and allowed to advance on said armature for driving the output means, and a resilient driving member fixedly interconnecting the torque transmitting member and the input shaft.

It is therefore a primary object of this invention to provide an improved self-adjusting electromagnetic friction device which uniquely combines the desirable features of both the disc and cone type electromagnetic friction devices. A particular feature of this invention, pursuant to this object, is the provision of a ferro-magnetic flat disc-like armature disposed normally to the clutch axis, and a cone-like organic friction member for torque transmission threadably connected and engageably responsive to said armature.

Another object of this invention is the provision of a more durable and economical electromagnetic friction device. Of particular concern is the ability to incorporate a cone type clutch with its high torque capabilities with a disc type armature having high magnetic engaging force characteristics.

It is another object of this invention to increase the torque of a single surface clutch by 100 percent while simultaneously maintaining the favorable engaging characteristics of a disc type clutch.

It is a still further object of this invention to provide an electromagnetic clutch mechanism which minimizes the reluctance in the flux path linkage by providing an armature which is not the principal torque carrying member. That is, the flat smooth contactive relationship between the armature and the electromagnet's pole faces is maintained throughout the life of the clutch. Thus, a strong magnetic engaging force is guaranteed regardless of the wear exhibited by the driving friction member which is the principal torque transmitting member.

Another object of this invention is to provide an electromagnetic clutch in which the electromagnetic engaging force is unaffected by wearing of the torque carrying members.

Yet another object of this invention is to provide an electromagnetic clutch in which many different friction materials, including organic materials, may be used for the principal torque transmitting members so that clutch torque, clutch life, and operational noise may be optimized.

It is another object of this invention to provide an electromagnetic clutch of the cone type wherein the cone friction member may be manufactured from a nonmagnetic material.

It is still further an object of this invention to provide an electromagnetic clutch of the cone type wherein the engaging magnetic flux path remains axial.

Still a further object of this invention is the provision of a unique and simplified wear adjusting means to automatically maintain the clutch armature in close contactive engagement with the electromagnet's pole faces, regardless of the wear experienced by the torque transmitting friction members.

It is another object of this invention to provide an efficient electromagnetic clutch with a new and economical wear compensating means.

It is even a further object of this invention to provide an electromagnetic clutch having high torque load capacity in a clutch housing of substantially smaller diameter. This feature further results in prolonged bearing life since dynamic unbalance is greatly reduced.

Other objects and advantages of this invention will become apparent from the following detailed description taken in conjunction with the accompanying drawings.

BRIEF DESCRIPTION OF THE DRAWINGS

The drawing shows, in a single FIGURE view, partially in section, the presently preferred embodiment of my invention in the disengaged position.

DESCRIPTION OF THE PREFERRED EMBODIMENT

Referring now to the drawing, there is shown an electromagnetic friction device 100 adapted to transmit rotative power and operate an output or driven means 12 which may include a fan (not shown) of the type used with an automotive vehicle air conditioning system. Of course, the output means 12 could comprise a shaft or some other device which would utilize the rotative power transferred to the output means.

The electromagnetic friction device 100 comprises generally rotatable driving or input means 10, and generally rotatable driven or output means 12. The driving means 10 is shiftable axially into friction engagement with the output means 12. The output element, denoted here by the fan blade 82, is secured to section 70 of the output means 12 by a plurality of bolts 83. The output means 12 is comprised of three concentric annular elements which form one integral rotatable body. In order to establish two separate flux conducting surfaces, the radially inner member 50 of the output means 12 is separated from the radially outer member 73 of the output means 12 by nonconductive ring 55. This particular feature of electromagnetic clutches, that is, establishing two poles, is well known in the art. Ring 55 may be manufactured from various nonmagnetic materials such as stainless steel, brass, etc. Inner member 50 of output means 12 is rotatably mounted by a bearing means 16 upon a cylindrical hub 18 of the input shaft 20, the bearing means 16 being disposed between the hub 18 and inner member 50 of the output means 12. The bearing means 16 comprises inner and outer races 24 and 26, each race being secured against axial movement by cooperation of snap ring 27 and shoulders 51 and 21 provided respectively on the inner surface of member 50 and the outer surface of hub 18. A plurality of ball bearings 29 received within annular grooves 30 provided in the internal surface of the races 24 and 26, maintain section 50 in proper alignment with the input shaft 20 and allows the output means 12 to rotate thereon. Member 50 has a pole face 53 which is normal to the input shaft axis and parallel to the clutch's annular armature 14. Member 73, the outer member of driven means 12, has a pole face 75 also disposed normal to the clutch axis and parallel to armature 14. Member 73 has a frustro-conical section 70 cut therein for receiving the principal torque transmitting member 60. Section 70 has a frustro-conical surface 72 which is tapered radially inwardly toward the interior of the fraction device 100. Member 70 is the principal torque carrying member of the output means 12. Although member 70 is shown as being integral with member 73, it is possible to form the annular section 70 from a nonmagnetic conducting material and secure it to member 73, or to fasten a friction material to the frustro-conical face 72 of member 70. The use of magnetically nonconductive materials for the torque carrying member of the output means 12 is possible since the flux path is not required to pass through the torque transmitting surfaces of the clutch.

The clutch actuating means comprises the flux conducting members 73 and 50 of the output means 12, an electromagnetic winding 95, and a flux conducting housing 90 for the winding 95. The electromagnetic winding or coil 95 is disposed within cavity 97 of the housing 90 and is contained therein by epoxy 96 or other suitable adhesives. The coil 95 may be manufactured from copper wiring, aluminum foil, or the like, and is suitably connected to a d. c. power source and an electrical control means (not shown). Housing 90 is axially fixed and nonrotatably mounted to hub 18 of input shaft 20 in a manner similar to that described above for output means 12 by bearing means 17.

The clutch driving or input means 10 is essentially comprised of four parts. The first part is the input shaft 20 to which a resilient torque transmitting member 40 is rotatably secured. Member 40, the second part, is fixedly connected to input shaft 20 by any suitable means although only welding is shown. Member 40 may be a "three-finger spring," a flexible steel diaphragm, or any other resilient member that will have the characteristics necessary to efficiently perform as the armature return spring, and as the member which transmits torque from the input shaft 20 to the torque transmitting cone member 60.

The third essential part of driving means 10 is an annular friction ring 60 which is connected to flexible member 40 by any suitable means, such as a plurality of screws 61. The radially outer surface of member 60 has a frustro-conical face 62 adapted to frictionally engage with mating frustro-conical face 72 of section 70 of the driven means 12. The cylindrical internal surface 63 of friction member 60 is threaded entirely therealong. Since the torque transmitting member 60 is not in the flux path, it may be fabricated from a wide selection of magnetically non-conductive friction materials. Member 60 is fabricated from an organic friction material in the preferred embodiment; thus, clutch torque, clutch life, and operational noise are optimized to an extent never before possible, even with clutches of similar design.

The fourth part of the driven means 12 is the annular armature ring element 14 having a radially outer surface 15 threadably received within the inner threaded surface 63 of friction member 60. An annular groove 67 is provided in the outer surface 15 of armature 14 for receiving an annular drag ring 68 which is adapted to maintain friction member 60 in an axial and rotational fixed position relative to armature ring 14 when no appreciable turning force is applied to armature 14. The helically threaded connection between friction member 60 and armature 14, along with the retarding effect of drag ring 68, comprises the self-adjusting wear compensating feature of this invention. It should be noted that the drag ring 68 could also be located external of armature 14 and furnish the same retarding effect upon the relative motion between friction member 60 and armature 14. Armature 14 is shown in a disengaged mode with a friction member 60 being fully withdrawn. The relative "play" in the thread between surfaces 15 and 63 is controlled by thread tightening set screw 81.

OPERATION

In operation, the armature ring element 14 is moved axially into engagement with the pole faces 53 and 75 of the driven or output means 12 upon energization of the electromagnetic winding 95. The magnetic engaging forces exerted on armature 14 are completely axial and, therefore, provide a close contact between the pole faces and the armature 14. At this time, friction member 60 remains axially spaced apart from section 70 of the driven means 12. As the rotational velocity of armature 14 is decreased by the rotatably static condition of output means 12, friction member 60 which is still being driven at input speed through diaphragm 40 is caused to screw inwardly of the device thereby advancing frustro-conical surface 62 into contactive engagement with frustro-conical surface 72 of the output means 12. Armature 14 remains in close contact with the pole faces 53 and 75 of the driving means 10 and no air gap between these members is allowed to develop, while simultaneously, almost all torque transferred between the driving means and the driven means is being carried by the frustro-conical or cone-like surfaces 62 and 72. The resilient diaphragm or torque transmitting member 40 provides a direct mechanical link between the driven friction member 60 and the input shaft 20.

Whenever the electromagnetic winding 95 is de-energized, cone member 60 and, therefore, armature 14 are axially withdrawn from the output means 12 under the influence of flexible member 40. When the electromagnet is again energized, its action upon the armature 14 will instantly draw the cone clutch member 60 into operative position to rotate output member 70 of the driven means 12. No further rotative movement of friction member 60 upon the screw threaded surface of armature 14 will take place until the frictional surfaces 62 and 72 become worn. The simultaneous engagement of armature 14 with the pole faces 53 and 75 of the driven means 12 and the engagement of friction member 60 with the driven surface 72 of driven means 12 is a result of the retarding effect caused by drag ring 68; that is, drag ring 68 will only permit friction member 60 to rotate in one direction relative to armature 14, that direction being the direction of rotation of the driving means 10. Any loss motion occasioned by the wearing away of the frictional surfaces 62 and 72 will be at once taken up by the rotation of the fraction ring 60 upon the screw threaded outer surface 15 of armature 14. The screw threaded connection between armature 15 and friction member 60 automatically adjusts the position of member 60 to take up any wear that may occur. A more detailed description of drag ring 68 and its operative cooperation with the armature and the friction member can be found in commonly assigned pending application U.S. Ser. No. 129740 filed on even date.

While only one embodiment of the invention has been disclosed, it will be apparent to those skilled in the art that changes may be made to the invention as set forth in the appended claims, and, in some cases, certain features of the invention may be used to advantage without corresponding use of other features. Accordingly, it is intended that the illustrative and descriptive materials herein be used to illustrate the principles of the invention and not to limit the scope thereof.

I claim:

1. An electromagnetic friction device for torque transmission comprising:
    input means;
    output means;
    driving means for transferring torque from said input means to said output means, said driving means including a cone shaped friction ring member, said member having a helical thread along its inner diameter;
    an annular ferro-magnetic armature, said armature being threadably received in the helical thread of said cone member for relative rotation therewith, the threaded connection of said cone member and said armature being such that said cone member is adapted to advance on its thread into axial engagement with the output means; and
    electromagnetic means for actuating said friction device, said means producing a circuitous flux path through said armature when energized.

2. An electromagnetic clutch apparatus for torque transmission comprising:
    an input shaft;
    output means mounted in axially fixed position on said input shaft and free to rotate thereon, said output means having a frustro-conical friction face tapering radially inward and a flat annular pole face disposed normally to the axis of said input shaft;
    clutch actuating means mounted adjacent to said output means, said actuating means including an electromagnetic winding;
    an armature drivingly connected to said input shaft, said armature being axially movable along said input shaft toward and away from said pole face of said output means in response to said clutch actuating means, said armature having an outer cylindrical threaded surface;
    a driving friction member having an inner cylindrical threaded surface adapted to threadably engage the outer surface of said armature, said friction member having a frustro-conical face for frictionally engaging the frustro-conical face of said output means; and
    a resilient torque transmitting member rotatably connecting said driving member to said input shaft, said member adapted to flex axially upon energization and de-energization of said actuating means;
    whereby said actuating means produces a circuitous flux path when energized which flux path passes through said pole face and said armature, moving said armature into contactive engagement with said pole face thereby imparting rotational momentum to said output means, said armature being threadably related to said driving friction member such that upon engagement of said armature and said output means said driving member advances on said threads of said armature thereby engaging the mating frustro-conical friction surface of said driving member and said output means until nearly all the torque transmitted between input and output is carried by said mating frictional surfaces.

3. In combination with an electromagnetic clutch of the type wherein torque is transmitted from an input means to an output means upon energization of an electromagnetic coil means and wherein the armature is disposed normally to the clutch axis for engagement with a magnetic pole face, the improvement which comprises:
    an annular frustro-conically shaped nonmagnetic friction member advanceably threaded to said armature for driving said output means when said electromagnetic coil means is energized; and
    resilient torque transmitting means fixedly interconnecting said friction member to said input means for imparting rotational motion to said friction member
    whereby the electromagnetic engaging force is axial through said armature, and the primary torque transferring surface is the frustro-conical surface of said friction member, therefore maintaining close contact between said armature and said pole face while simultaneously allowing said friction member to self-adjust for wear.

4. The combination as claimed in claim 3 including further means for retarding said friction member from reversing its direction of rotation relative to said armature.

5. The combination as claimed in claim 3 wherein said friction member is composed of an organic friction material.

* * * * *